Jan. 27, 1959 J. O. HUTCHINSON ET AL 2,871,348

DISCRIMINATOR CIRCUIT

Filed June 15, 1954

WITNESSES

Edwin E. Bressler

T. H. Murray

INVENTORS
James O. Hutchinson &
Raymond W. Briggs, II.
BY
F. E. Browder
ATTORNEY 2,871,348

DISCRIMINATOR CIRCUIT

James O. Hutchinson, Seattle, Wash., and Raymond W. Briggs, II, Glen Burnie, Md., assignors to Westinghouse Electric Corporation, East Pittsburgh, Pa., a corporation of Pennsylvania Application June 15, 1954, Serial No. 436,795

1 Claim. (Cl. 250—27)

This invention relates to a frequency discriminator circuit for use with a variable frequency alternating current source, and more particularly to a discriminator circuit which can be used successfully with a low voltage current source.

In automatic frequency control circuitry used for microwave reception, it has heretofore been common to heterodyne in a mixer circuit an incoming frequency modulated signal, amplify through several stages of amplification the intermediate frequency output of the mixer, and finally apply the amplified signal to a standard discriminator circuit. The use of several stages of amplification is necessary because of the low source impedance of the crystal in the mixer circuit and the consequent low voltage output of the mixer. The use of amplifiers, however, has certain disadvantages which could be eliminated if the output of the mixer circuit were applied directly to the discriminator.

It is, therefore, an object of our invention to provide an effective and sensitive discriminator circuit which can be directly connected to the low voltage output of a crystal mixer circuit without the necessity of intermediate amplification.

Another object of our invention is to provide a circuit for discriminating frequencies above and below a certain median frequency by the use of a pair of series resonant circuits, one of said circuits being tuned above the median frequency and the other of said circuits being tuned below the median frequency.

A still further object of our invention is to provide a discriminator circuit which utilizes capacitors in a pair of series resonant circuits to vary the grid voltages of a pair of triode vacuum tubes in accordance with the voltage change across the capacitors.

Figure 1:
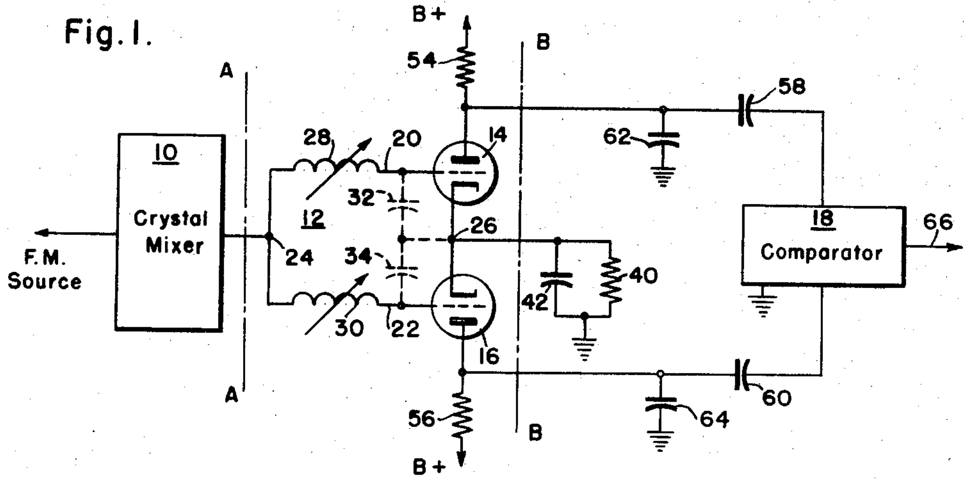
Figures 2, 3:
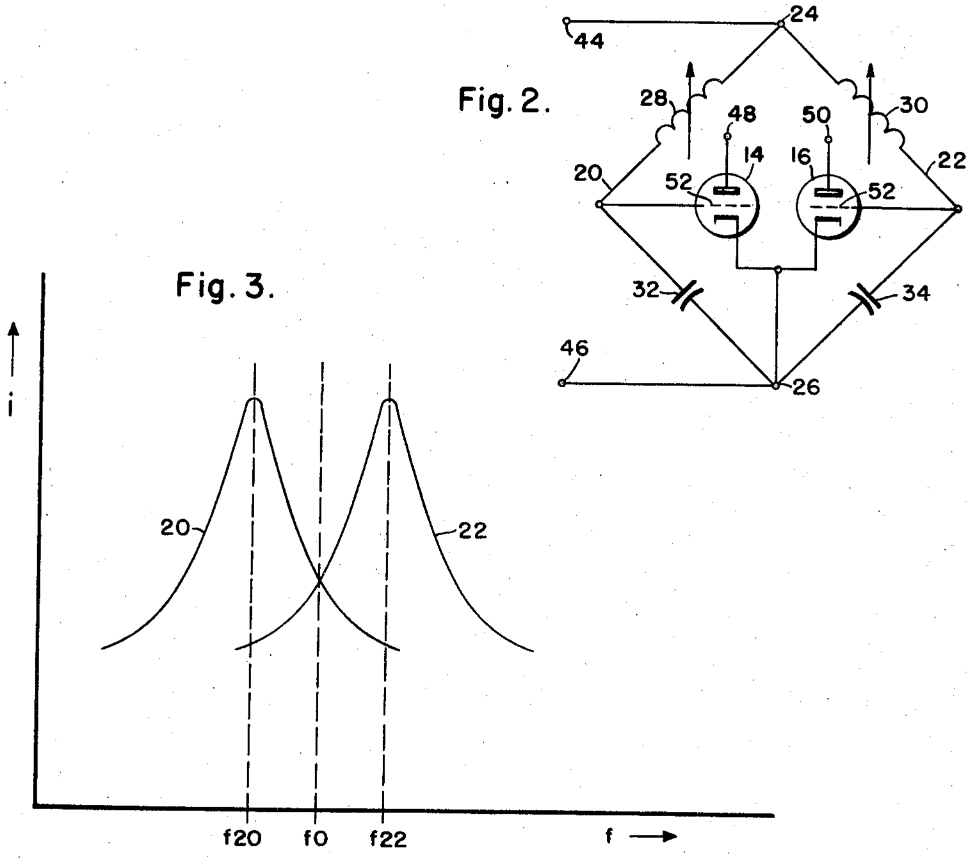

The above and other objects and features of our invention will become apparent from the following description taken in connection with the accompanying drawings which form a part of this specification and in which:

Figure 1 is a schematic illustration of the discriminator network showing its connection to a detector circuit;

Fig 2 discloses in bridge circuit form the portion of Fig. 1 included between lines A—A and B—B; and Fig. 3 is a graphic illustration of the operation of the circuit of Fig. 2.

Referring to Fig. 1, the network shown includes an intermediate frequency crystal mixer circuit 10 illustrated in block diagram form and having a connection to a source of frequency modulated waves (not shown). The I. F. output of the mixer circuit 10 is fed into a discriminator circuit 12 and the output of this circuit is, in turn, detected by triodes 14 and 16 and finally compared by a comparator circuit 18 to produce a varying direct current voltage which is proportional to the frequency of the input signal received by circuit 10.

Discriminator circuit 12 comprises a pair of identical series resonant circuits 20 and 22 which are connected in parallel between points 24 and 26. Each circuit includes an inductance 28 or 30 and an interelectrode grid-to-cathode capacitance 32 or 34, represented in dotted lines. Cathode biasing is provided for tubes 14 and 16 by a cathode resistor 40 and by-pass condenser 42.

The operation of the discriminator circuit 12 can best be understood by reference to Fig. 2 which illustrates the circuit in an equivalent, simplified form. Assume that the I. F. input signal is connected to terminals 44 and 46 and that the output is impressed across terminals 48 and 50. One of the resonant circuits 20 or 22 is tuned above a certain predetermined or normal frequency and the other of the circuits is tuned in equal amount below the predetermined frequency. Connected to the junction of the capacitance and inductance in each circuit are the grids 52 of tubes 14 and 16. The cathodes of said tubes are both connected to the junction of the capacitances in the circuits 20 and 22 at point 26. It follows, therefore, that capacitance 32 is included in the grid circuit of tube 14 and capacitance 34 is included in the grid circuit of tube 16. If the currents passing through capacitances 32 and 34 are equal, the grid voltage in tubes 14 and 16 will be equal and, therefore, the output of the tubes will also be equal. If, however, the currents in circuits 20 and 22 are not equal, the output of the tubes will be unbalanced.

The operation of circuit 12 is graphically illustrated in Fig. 3, wherein the resonance curves of circuits 20 and 22 are shown. $f_0$ represents the aforesaid predetermined or normal frequency above and below which circuits 20 and 22 are tuned. $f_{20}$ represents the resonant frequency of circuit 20 and $f_{22}$ represents the resonant frequency of circuit 22. If the input I. F. frequency should exceed $f_0$, the current in circuit 22 will rise sharply and that in circuit 20 will fall sharply. The sharp rise and fall in the currents will be reflected in the grid voltages and anode circuit outputs of tubes 16 and 14, respectively. A drop in input frequency from $f_0$ will simply reverse the process and likewise reverse the output polarity of the network. It can be seen, therefore, that the output of circuit 12 is a varying direct current voltage, the amplitude of which depends upon the degree of change from the predetermined frequency $f_0$ and the polarity of which depends upon whether the aforesaid frequency change is above or below $f_0$. It should be noted that a relatively large current change is produced in each circuit for a small frequency change. The circuit, therefore, is especially adapted for use with a low voltage signal such as that received from a crystal mixer.

Referring again to Fig. 1, the load circuit for the output of discriminator 12 will now be described. The anodes of tubes 14 and 16 are connected to a source of positive anode voltage through resistors 54 and 56 respectively. In the paths connecting the anodes of tubes 14 and 16 with comparator 18 are a pair of D. C. blocking condensers 58 and 60. Also connected to each path is an R. F. bypass condenser 62 or 64 which serves to filter radio frequencies from the load circuit. Different types of comparators are well-known in the art; and, therefore, a detailed description of comparator 18 is not included herein. It will be sufficient to say that the output voltage of comparator 18 will be equal to the difference between the voltages appearing at the anodes of tubes 14 and 16. These voltages are directly dependent upon the degree of frequency change of the input signal from $f_0$ as explained above. If the frequency of the signal from mixer circuit 10 is equal to $f_0$, then the output currents of tubes 14 and 16 will be equal. If these equal output currents are applied in opposition to circuit 18, their vectorial sum will be equal to zero. If the frequency of the signal input from mixer circuit 10 departs from $f_0$ the grid of one of tubes 14 or 16 will be biased negatively to a greater degree than the other, the output current from the tubes will differ, and the sum of the outputs of tubes 14 and 16 combined in opposition in comparator 18 will be some real voltage value appearing between terminal 66 and ground whose polarity will depend upon whether the frequency at any instant is above or below $f_0$ and whose magnitude will depend upon the extent to which the frequency departs from $f_0$.

While we have indicated and described only one particular system for carrying out invention into effect, it will be apparent to one skilled in the art that our invention is by no means limited to the particular arrangement shown and described, but that many modifications may be made without departing from the scope of our invention.

We claim as our invention:

A frequency discriminator network comprising a pair of input terminals having a connection to a variable frequency signal source, a pair of electron discharge devices, an anode, cathode and grid for each of said devices, a first inductor connecting the grid of one of said discharge devices to one of said input terminals, a second inductor connecting the grid of the other of said discharge devices to said one input terminal, means connecting the cathodes of said discharge devices to the other of said input terminals, said first inductor forming a first series resonant circuit with the grid-cathode capacitance of its associated discharge device, said first resonant circuit being tuned a predetermined amount below a reference frequency, said second inductor forming a second series resonant circuit with the grid-cathode capacitance of its associated discharge device, said second resonant circuit being tuned above said resonant frequency in an amount equal to said predetermined amount, and means for comparing the outputs of said discharge devices.

References Cited in the file of this patent

UNITED STATES PATENTS

| | | |
|---|---|---|
| 1,867,567 | Hansell | July 19, 1932 |
| 1,941,068 | Armstrong | Dec. 26, 1933 |
| 2,151,127 | Logan et al. | Mar. 21, 1939 |
| 2,286,378 | Roberts | June 16, 1942 |
| 2,412,482 | Vilkomerson | Dec. 10, 1946 |
| 2,494,751 | Forster | Jan. 17, 1950 |
| 2,601,340 | Stachura | June 24, 1952 |